No. 880,424.  
PATENTED FEB. 25, 1908.

A. O. TATE.  
STORAGE BATTERY PLATE.  
APPLICATION FILED OCT. 29, 1907.

WITNESSES:  
C. E. Ashley  
M. F. Keating

INVENTOR  
Alfred O. Tate  
By his Attorney,  
Charles J. Kintner

UNITED STATES PATENT OFFICE.

ALFRED O. TATE, OF TORONTO, ONTARIO, CANADA, ASSIGNOR TO TATE ELECTROLYTIC COMPANY OF AMERICA, A CORPORATION OF NEW YORK.

STORAGE-BATTERY PLATE.

No. 880,424. Specification of Letters Patent. Patented Feb. 25, 1908.

Application filed October 29, 1907. Serial No. 399,643.

*To all whom it may concern:*

Be it known that I, ALFRED O. TATE, a subject of the King of Great Britain, residing in the city of Toronto, Province of Ontario, county of York, and Dominion of Canada, have made a new and useful Invention in Storage-Battery Plates, of which the following is a specification.

My invention relates particularly to storage battery plates of the bifunctional type, such as are disclosed in prior applications filed by me in the U. S. Patent Office, bearing respectively No. 289,796, filed Dec. 1st, 1905 and No. 382,119, filed July 3rd, 1907, and it has for its objects, first, to provide a plate of this nature which will withstand very severe usage without damage. Second, to provide a plate of this nature in which the anode and cathode strips shall be rigidly sustained at all times so that their mechanical and electrical relations shall not be materially varied in use. Third, to provide a plate of this nature in which the anode and cathode strips shall be separated from each other by well defined spaces and the active material applied thereto on their opposite faces, and in such manner that the entire side or lateral faces of the electrode shall be practically perfect planes so that the active material may be effectively inclosed within the face of the plate and practical results of an important nature obtained. Fourth, to provide a plate of this nature in which the supporting base of the anode and cathode strips shall be practically rigid and the strips secured in grooves therein with a fixed or definite relation to each other. Fifth, to provide a plate of this nature in which the anode and cathode strips shall be supported by a rigid non-conducting plate and located in definite relation to each other with the active material applied thereto, and to further provide means for maintaining the same in a fixed or definite relation to said strips.

Figure 1:
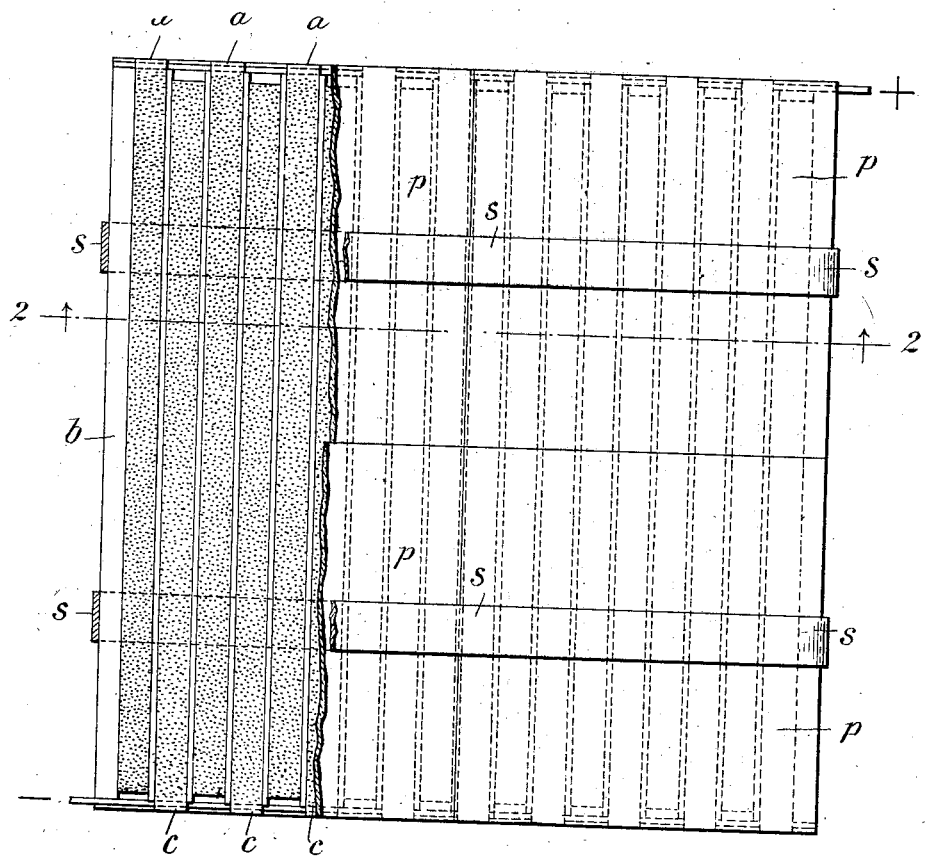
Figure 2:
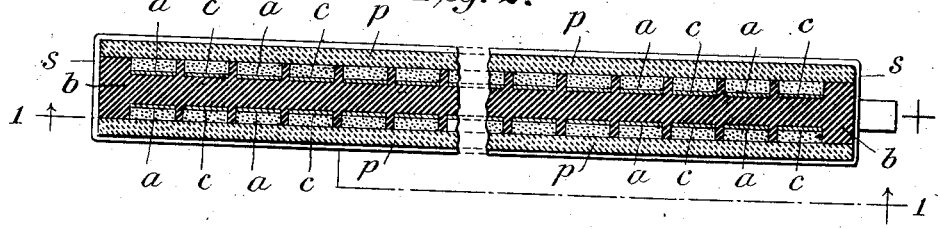

My invention will be fully understood by referring to the accompanying drawings, in which, Figure 1 is a part side elevational, part sectional view of my novel bifunctional storage battery plate, the section being taken through Fig. 2 on the broken line 1—1 and as seen looking thereat from the bottom toward the top of the drawings in the direction of the arrows. Fig. 2 is a transverse sectional view taken through Fig. 1 on the line 2—2 and as seen looking thereat from the bottom toward the top of the drawings in the direction of the arrows.

The bifunctional plates disclosed in the before-mentioned applications embody a series of thin narrow interleaved anode and cathode strips, the anode strips being connected at one end to a conducting bar or rod and the cathode strips being similarly connected at the other end, said strips being separated by thin insulating media and all bound together by binding blocks and nuts secured upon the ends of the aforesaid bars or rods, the action of the electrolyte being through the insulating material upon the lateral faces of the plate.

The present improvement is designed to produce a bifunctional storage battery plate which shall be simpler in construction and of a more rigid nature, in that the anode and cathode strips are located in pairs, side by side, in grooves or channels in the faces of a rigid non-conducting base or support and said anode and cathode strips are connected one set at one end to a common conductor and the other set at the other end to a similar conductor, after which the active material is applied to the faces of said anode and cathode strips and both faces of the entire electrode covered by porous insulating media held in place by any preferred means.

Referring now to the drawings in detail for a description of the invention, such as will enable others skilled in the art to construct and use the same, $b$ represents the supporting base made preferably of hard rubber, treated vegetable fiber, marble, or any well known insulating material which will withstand proper usage and will not be acted upon by the electrolyte. This base is grooved or channeled in the direction of its length on its opposite faces, after which the anode strips $a, a, a$, are located in each alternate pair of grooves on the opposite faces thereof and secured in any preferred manner directly thereto. The upper or loop ends of said anode strips are then secured by lead brazing or in any preferred manner to a common conductor, indicated in the right of Fig. 1 by a plus mark. The lower or loop ends of the cathode strips $c, c, c$, are similarly secured in the alternate grooves or channels from the bottom and are attached in like manner directly to a common conductor indicated on the left Fig. 1 by a minus mark. The active material, such as red lead or any of the well known equivalent substances, is then firmly packed in place in the grooves or channels against the outer faces of the anode and cathode strips on both sides, until said grooves or channels are filled and the electrode plate assumes a plane surface on each face, the adjoining edges of the anode and cathode strips and the active material packed thereon being located in each instance at definite distances from each other throughout both faces.

$p$ represents one or more (preferably of four) plates of porous material, such as kaolin, the same constituting means for protecting the opposite faces of the electrode and for preventing the active material from falling out of the supporting grooves or channels. $s$ represents flexible strips, preferably of rubber, for maintaining these plates in position against the faces of the electrode.

I do not limit my improvement to the special structure illustrated in the accompanying drawings, as a number of the features thereof might be materially departed from and still come within the scope of my claims hereinafter, the generic feature of my invention lying in the provision of a bifunctional storage battery plate having a rigid frame or support for interelated anode and cathode strips secured thereto and in such manner that they always maintain a definite relation toward each other when in use, the action of the plate, both in charging and discharging, being from pairs of anode strips $a, a, a$, through definite or fixed distances of insulation to and through corresponding pairs of cathode strips similarly rigidly fixed, so that the entire electrode has a permanent or fixed relation of parts which cannot be varied mechanically or electrically in use and I wish it understood that my claims are generic in this respect. Nor do I limit myself to the especial means disclosed in the accompanying drawings for maintaining the active material in place, as this feature may be varied by many well known mechanical devices, any of which will permit the free access of the electrolyte to the active material.

Having thus described my invention what I claim and desire to secure by Letters Patent of the United States is—

1. A bifunctional storage battery plate, embracing a rigid base provided with grooves on its opposite faces and anode and cathode strips located in said grooves in definite or fixed relation to each other, substantially as described.

2. A bifunctional storage battery plate, embracing a rigid base and a series of alternately disposed anode and cathode strips secured to the opposite faces thereof, substantially as described.

3. A bifunctional storage battery plate, embracing a rigid insulating base plate provided with means on its opposite faces for sustaining alternately disposed anode and cathode strips in a fixed relation to each other, substantially as described.

4. A bifunctional storage battery plate, embracing a rigid insulating base plate, having closely related grooves or channels on its opposite faces, and alternately disposed sets of anode and cathode strips located in said grooves, substantially as described.

5. A bifunctional storage battery plate, embracing a rigid insulating base plate grooved or channeled on its opposite faces; alternately disposed anode and cathode strips located in said grooves; the anode strips being connected at one end to a common conductor and the cathode strips similarly connected to a like conductor, substantially as described.

7. A bifunctional storage battery plate, embracing an insulating base plate provided with means on its opposite faces for sustaining or supporting alternately disposed anode and cathode strips and adapted to support active material about said strips, substantially as described.

6. A bifunctional storage battery plate, embracing an insulating base plate grooved or channeled on its opposite faces; alternately disposed anode and cathode strips and active material supported in said grooves or channels; in combination with means for preventing the active material from falling out, substantially as described.

8. A bifunctional storage battery plate, embracing a base or support grooved on its opposite faces; anode and cathode strips and active material located in said grooves, and means for preventing the active material from falling out, substantially as described.

9. A bifunctional storage battery plate, embracing a rigid base grooved on its opposite faces; anode and cathode strips and also active material located in said grooves, and liquid conveying protecting means secured to the plate for preventing the active material from falling out, substantially as described.

10. A bifunctional storage battery plate, embracing a base grooved on its opposite faces; anodes and cathodes and also active material located in said grooves; said anodes being connected in multiple to a common conductor and the cathodes similarly connected to a like conductor; in combination with porous protecting plates and means for securing said plates to the base in such manner as to prevent the active material from falling out, substantially as described.

In testimony whereof I have signed my name to this specification in the presence of two subscribing witnesses.

ALFRED O. TATE.

Witnesses:
 WM. G. CHITTICK, Jr.,
 C. J. KINTNER.